(12) United States Patent
Smith et al.

(10) Patent No.: US 12,100,393 B1
(45) Date of Patent: Sep. 24, 2024

(54) APPARATUS AND METHOD OF GENERATING DIRECTED GRAPH USING RAW DATA

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/600,375

(22) Filed: Mar. 8, 2024

(51) Int. Cl.
*G10L 15/00* (2013.01)
*G06F 40/20* (2020.01)
*G10L 15/16* (2006.01)

(52) U.S. Cl.
CPC .............. *G10L 15/16* (2013.01); *G06F 40/20* (2020.01)

(58) Field of Classification Search
None
See application file for complete search history.

(56) References Cited

U.S. PATENT DOCUMENTS

| | | | |
|---|---|---|---|
| 11,062,270 B2 | 7/2021 | Hilleli | |
| 11,263,486 B2 | 3/2022 | Benkreira | |
| 11,386,890 B1 * | 7/2022 | Fan | G06F 40/30 |
| 11,393,456 B1 * | 7/2022 | Guo | G10L 15/063 |
| 11,449,769 B2 * | 9/2022 | Kanamatareddy | G06N 20/00 |
| 11,727,007 B1 * | 8/2023 | Kulkarni | G06N 5/01 |
| | | | 707/769 |
| 11,776,530 B2 * | 10/2023 | Amores | G10L 15/063 |
| | | | 704/232 |
| 2021/0089375 A1 * | 3/2021 | Ghafourifar | G06F 9/453 |
| 2021/0272040 A1 | 9/2021 | Johnson | |

* cited by examiner

*Primary Examiner* — Satwant K Singh
(74) *Attorney, Agent, or Firm* — Caldwell Intellectual Property Law

(57) ABSTRACT

An apparatus and method of generating directed graph using raw data are disclosed. The apparatus includes at least a processor and a memory communicatively connected to the at least a processor, wherein the memory contains instructions configuring the at least a processor to receive raw data from one or more data sources, determine a plurality of execution elements from the raw data, determine a data extrapolation of the plurality of execution elements, wherein determining the data extrapolation further includes determining at least an operation datum for the plurality of execution elements and generate a directed graph as a function of the data extrapolation, wherein the directed graph comprises an ordered series of the plurality of execution elements connected using the at least an operation datum.

20 Claims, 9 Drawing Sheets

APPARATUS AND METHOD OF GENERATING DIRECTED GRAPH USING RAW DATA

FIELD OF THE INVENTION

The present invention generally relates to the field of directed graph. In particular, the present invention is directed to apparatus and method of generating directed graph using raw data.

BACKGROUND

Directed graphs, also known as digraphs, provide a powerful framework for modeling and understanding such relationships. Directed graphs consist of nodes (vertices) and edges with defined directions, enabling the depiction of intricate dependencies and hierarchies. Current methods for creating directed graphs often involve manual or static processes, limiting adaptability to dynamic data environments.

SUMMARY OF THE DISCLOSURE

In an aspect, an apparatus of generating directed graph using raw data are disclosed. The apparatus includes at least a processor and a memory communicatively connected to the at least a processor, wherein the memory contains instructions configuring the at least a processor to receive raw data from one or more data sources, determine a plurality of execution elements from the raw data, determine a data extrapolation of the plurality of execution elements, wherein determining the data extrapolation further includes determining at least an operation datum for the plurality of execution elements and generate a directed graph as a function of the data extrapolation, wherein the directed graph comprises an ordered series of the plurality of execution elements connected using the at least an operation datum.

In another aspect, a method of generating a directed graph using raw data is disclosed. The method includes receiving, using at least a processor, raw data from one or more data sources, determining, using the at least a processor, a plurality of execution elements from the raw data, determining, using the at least a processor, a data extrapolation of the plurality of execution elements, wherein determining the data extrapolation further includes determining at least an operation datum for the plurality of execution elements and generating, using the at least a processor, a directed graph as a function of the data extrapolation, wherein the directed graph comprises an ordered series of the plurality of execution elements connected using the at least an operation datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods of generating directed graph using raw data are disclosed. The apparatus includes at least a processor and a memory communicatively connected to the at least a processor, wherein the memory contains instructions configuring the at least a processor to receive raw data from one or more data sources, determine a plurality of execution elements from the raw data, determine a data extrapolation of the plurality of execution elements, wherein determining the data extrapolation further includes determining at least an operation datum for the plurality of execution elements and generate a directed graph as a function of the data extrapolation, wherein the directed graph comprises an ordered series of the plurality of execution elements connected using the at least an operation datum. Exemplary embodiments illustrating aspects of the present disclosure are described below in the context of several specific examples.

Figure 1:
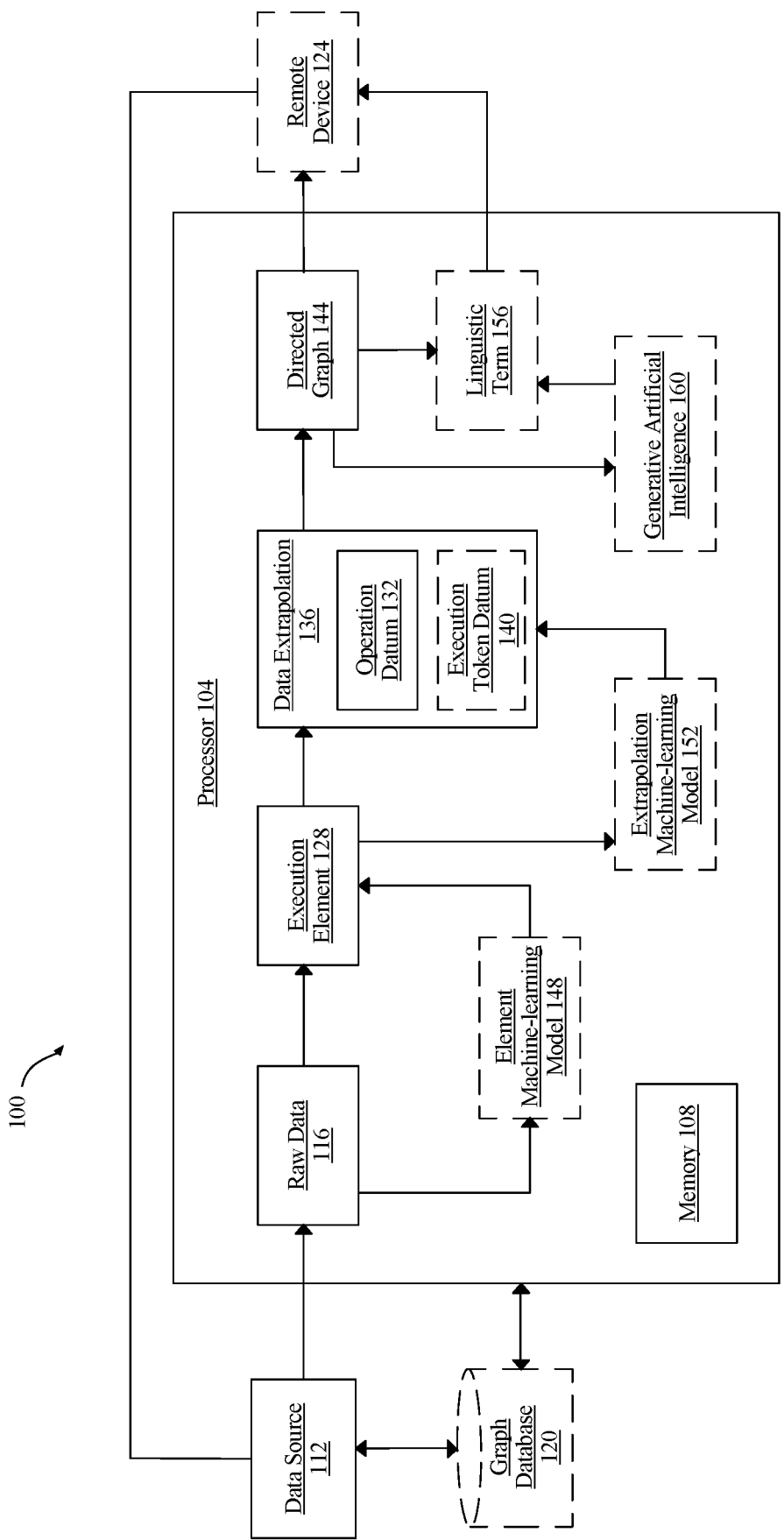
FIG. 1 is a flow diagram illustrating a method of generating a directed graph using raw data.

Referring now to FIG. 1, an exemplary embodiment of an apparatus 100 for generating a directed graph is illustrated. Apparatus 100 may include a computing device. Apparatus 100 or computing device includes at least a processor 104 communicatively connected to a memory 108. As used in this disclosure, "communicatively connected" means connected by way of a connection, attachment or linkage between two or more related which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, computing device or processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device or processor 104 may be designed and/or configured to perform any method, method step, or sequence of method steps in any embodiment described in this disclosure, in any order and with any degree of repetition. For instance, computing device or processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, memory 108 includes instructions configuring processor 104 to receive raw data 116 from one or more data sources 112. For the purposes of this disclosure, "raw data" is any unprocessed and unstructured data or information that is collected directly from data sources. In some embodiments, raw data 116 may include text, audio, image, video, or the like. In some embodiments, raw data 116 may include any data related to a user. For the purposes of this disclosure, a "user" is any person, group, system, or device that uses an apparatus 100. As a non-limiting example, user may include a chief executive officer (CEO) of a company, project team, processor, company, computing device, or the like. In a non-limiting example, raw data 116 may include an audio record of speech of a user, history of conversation in a chat bot, images of products, systems, or user, video of a user's speech, document, computer codes, programming languages, or the like. For example, and without limitation, raw data 116 may include a CEO or employee talking about their product or service in a video. In some embodiments, raw data 116 may be stored in graph database 120. In some embodiments, raw data 116 may be retrieved from graph database 120.

With continued reference to FIG. 1, for the purposes of this disclosure, a "data source" is any place, system, tool, device or location from which data originates. In some embodiments, data source 112 may include a remote device 124. For the purposes of this disclosure, a "remote device" is any device or tool a user uses to input data. As a non-limiting example, remote device 124 may include a laptop, desktop, tablet, mobile phone, smart phone, smart watch, kiosk, screen, smart headset, processor, or things of the like. In some embodiments, remote device 124 may include a user interface configured to receive inputs from user. In some embodiments, user may manually input any data such as but not limited to raw data 116, execution element 128, operation datum 132, or the like into apparatus 100 using remote device 124. In some embodiments, user may have a capability to process, store or transmit any information independently. In some embodiments, data source 112 may include an application residing on remote device 124. For the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device such as but not limited to remote device 124, distinct from and communicatively connected to a processor 104. In an embodiment, user interface may include a graphical user interface. A "graphical user interface," as used herein, is a graphical form of user interface that allows entities to interact with electronic devices. In some embodiments, GUI may include icons, menus, other visual indicators or representations (graphics), audio indicators such as primary notation, and display information and related user controls. A menu may contain a list of choices and may allow entities to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in some embodiments, data source 112 may include a database. In some embodiments, database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In one or more embodiments, database may include inputted or calculated information and datum. As a non-limiting example, the datum history may include real-time and/or previous inputted data. In some embodiments, database may include instructions from a user, who may be an expert user, a past user in embodiments disclosed herein, or the like, where the instructions may include examples of the data related to user or raw data 116.

With continued reference to FIG. 1, in some embodiments, database may include keywords. As used in this disclosure, a "keyword" is an element of word or syntax used to identify and/or match elements to each other. For example, without limitation, the keyword may include user's name in the instance that user is looking for data related to user. In another non-limiting example, the keyword may include the name of product in the instance that user is looking for data related to a specific product.

With continued reference to FIG. 1, in some embodiments, database may include a graph database 120. In some embodiments, data source 112 may include graph database 120. As used in this disclosure, "graph database" is a data structure configured to store data associated with user or raw data. As a non-limiting example, graph database 120 may store raw data 116, execution element 128, data extrapolation 136, operation datum 132, execution token datum 140, directed graph 144, and the like. In one or more embodiments, graph database 120 may include inputted or calculated information and datum related to user or raw data 116. In some embodiments, a datum history may be stored in graph database 120. As a non-limiting example, the datum history may include real-time and/or previous inputted data to processor 104 related to user or raw data 116. As a non-limiting example, graph database 120 may include instructions from a user, who may be an expert user, a past user in embodiments disclosed herein, or the like, where the instructions may include examples of the data related to user such as but not limited to raw data 116, execution element 128, data extrapolation 136, operation datum 132, execution token datum 140, directed graph 144, or the like.

With continued reference to FIG. 1, in some embodiments, graph database 120 or any database described in this disclosure may be communicatively connected with processor 104. For example, and without limitation, in some cases, graph database 120 may be local to processor 104. In another example, and without limitation, graph database 120 may be remote to processor 104 and communicative with processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. The network may use an immutable sequential listing to securely store graph database 120. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, data source 112 may include application programming interface (API). As used herein, an "application programming interface" is a set of functions that allow applications to access data and interact with external software components, operating systems, or microdevices, such as another web application or computing device.

With reference to FIG. 1, in some embodiments, data source 112 may include a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate web crawler to scrape raw data 116 from user's website. As a non-limiting example, processor 104 may obtain user's web browsing history or pattern using web crawler. The web crawler may be seeded and/or trained with a reputable website to begin the search. Web crawler may be generated by processor 104. In some embodiments, web crawler may be trained with information received from user through a user interface. In some embodiments, web crawler may be configured to generate a web query. A web query may include search criteria received from user. For example, user may submit a plurality of websites for web crawler to search to raw data 116. Additionally, web crawler function may be configured to search for and/or detect one or more data patterns. A "data pattern," as used in this disclosure, is any repeating forms of information. In some embodiments, web crawler may be configured to determine the relevancy of a data pattern. Relevancy may be determined by a relevancy score. A relevancy score may be automatically generated by processor 104, received from a machine-learning model, and/or received from user. In some embodiments, a relevancy score may include a range of numerical values that may correspond to a relevancy strength of data received from a web crawler function. As a non-limiting example, a web crawler function may search the Internet for raw data 116 related to user.

With continued reference to FIG. 1, in some embodiments, data source 112 may include a chatbot. For the purposes of this disclosure, "chatbot" is an artificial intelligence (AI) program designed to simulate human conversation or interaction through text, voice-based or image-based communication. Chatbot disclosed herein is further described with respect to FIG. 3. In a non-limiting example, processor 104 may obtain raw data 116 using chatbot. For example, and without limitation, raw data 116 obtained using chatbot may include a question, response, statement, or the like input by user, question, response, statement, or the like generated for user. In some embodiments, chatbot may include generative artificial intelligence (AI), large language model (LLM), or the like. In some embodiments, data source 112 may include a secure communication channel interface. In some embodiments, processor 104 may be configured to establish a secure communication channel interface between a remote device 124 and processor 104. A "secure communication channel interface," as used in this disclosure, is a communication medium within an interface. A secure communication channel interface may include an application, script, and/or program capable of providing a means of communication between at least two parties, including any oral and/or written forms of communication. A secure communication channel interface may allow processor 104 to interface with electronic devices through graphical icons, audio indicators including primary notation, text based user interfaces, typed command labels, text navigation, and the like. A secure communication channel interface may include slides or other commands that may allow user to select one or more options. A secure communication channel interface may include free form textual entries, where a user may type in a prompt, response and/or message. In some embodiments, processor 104 may be configured to receive prompt from remote device 124 using secure communication channel interface. A secure communication channel interface may include a display interface. Display interface may include a form or other graphical element having display fields, where one or more elements of information may be displayed. Display interface may display data output fields including text, images, or the like containing one or more messages. A secure communication channel interface may include data input fields such as text entry windows, drop-down lists, buttons, checkboxes, radio buttons, sliders, links, or any other data input interface that may capture user interaction as may occur to persons skilled in the art upon reviewing the entirety of this disclosure.

With continued reference to FIG. 1, memory 108 contains instructions configuring processor 104 to determine a plurality of execution elements 128 from raw data 116. For the purposes of this disclosure, an "execution element" is an element of raw data that has sufficient value, importance, or significance to be worth executing by a user. As a non-limiting example, execution element 128 may include a keyword, piece of code, object or label of object in image or video, device or component of system, or the like. In a non-limiting example, execution element 128 may solve a technical problem of a user. In another non-limiting example, execution element 128 may deliver a monetary value to a user. In some embodiments, execution element 128 may be stored in graph database 120. In some embodiments, execution element 128 may be retrieved from graph database 120. In some embodiments, user may manually determine execution element 128 from raw data 116.

With continued reference to FIG. 1, in some embodiments, processor 104 may be configured to determine execution elements 128 from raw data 116 using a clustering algorithm or a classifier. The clustering algorithm is further described below. In some embodiments, processor 104 may be configured to determine one clustering algorithm from a plurality of clustering algorithms to cluster raw data 116. As a non-limiting example, clustering algorithm may include a particle swarm optimization algorithm, a k-means clustering algorithm, any clustering algorithm described in the entirety of this disclosure, or any clustering algorithm that may occur to persons skilled in the art upon reviewing the entirety of this disclosure; k-means clustering algorithms are further described below for exemplary purposes. In a non-limiting example, processor 104 may generate execution element 128 from raw data 116 by clustering raw data 116, and label the clusters (execution element 128); for instance, raw data 116 may be grouped by a clustering algorithm around centroids, and labels may be automatically assigned to centroids and/or may be labeled using user-entered labels for such centroids. In some embodiments, labeled clusters may be used as execution element 128 and the correlation of clusters to datasets may be used to train a classifier, such as a group classifier. In some embodiments, generating training data and training classifier may be simultaneous; for instance, clustering algorithm and/or a classifier using a similar distance metric may be used to associate raw data 116 with one or more centroids, which may enable raw data 116 to be classified to clusters (execution element 128) associated with such centroids. As a non-limiting example, once clusters or labels are identified or generated, a dataset may be matched to one of the clusters and its label.

With continued reference to FIG. 1, as a non-limiting example, processor 104 may implement a feature learning algorithm to condition raw data 116. In some embodiments, a classifier may additionally rely on a feature learning algorithm to build the appropriate associations around each raw data 116. A "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of features (execution element 128) and cluster raw data 116 into clusters as a function of the detected co-occurrences of features. As a non-limiting example, feature learning algorithm may detect certain set of events (execution element 128) frequently appear together or in close succession. In an embodiment, first feature learning algorithm may perform clustering of data.

With continued reference to FIG. 1, in some embodiments, at least a processor 104 may analyze raw data 116 or document to find execution element 128 using optical character recognition (OCR). For the purposes of this disclosure, "optical character recognition" is a technology that enables the recognition and conversion of printed or written text into machine-encoded text. In some cases, processor 104 may be configured to recognize a keyword using the OCR to find execution element 128. In some cases, the at least a processor 104 may transcribe much or even substantially all raw data 116.

With continued reference to FIG. 1, in some embodiments, optical character recognition or optical character reader (OCR) may include automatic conversion of images of written (e.g., typed, handwritten or printed text) into machine-encoded text. In some cases, recognition of a keyword from raw data 116 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of raw data 116. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the raw data 116 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 4. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes raw data 116. Since the adaptive classifier may have learned something useful a little too late to recognize characters on the first pass, a second pass may be run over the raw data 116. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some cases, processor 104 may include audiovisual speech recognition (AVSR) processes to recognize execution element 128 in video of raw data 116. For example, processor 104 may use video of raw data 116 to aid in recognition of audible verbal content such as viewing a user move their lips to speak on video to process execution element 128. AVSR may use video of raw data 116 to aid the overall translation of the execution element 128 of raw data 116. In some embodiments, AVSR may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstral coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize execution element 128. For instance, audio vector and image vector may each be concatenated and used to predict speech made by a user, who is 'on camera.'

With continued reference to FIG. 1, in some embodiments, processor 104 may obtain execution element 128 using an automatic speech recognition (ASR). As a non-limiting example, ASR may analyze a record of a call or conversation, voice message, record of speech, or the like. For the purposes of this disclosure, "automatic speech recognition" is a technology that converts spoken language into written text or machine-readable form. In some embodiments, ASR may include techniques employing language processing to aid speech recognition processes. In some cases, ASR may be used to decode (i.e., recognize) indeterministic phonemes or help in forming a preponderance among probabilistic candidates. In some cases, ASR may include an audio-based automatic speech recognition process and an image-based automatic speech recognition process. ASR may analysis audio according to any method described herein, for instance using a Mel frequency cepstral coefficients (MFCCs) and/or log-Mel spectrogram derived from raw audio samples. In some cases, feature recognition may include any feature recognition process described in this disclosure, for example a variant of a convolutional neural network. In some cases, ASR employs an audio datum to recognize execution element 128. For instance, audio vector may each be concatenated and used to predict speech made by user.

With continued reference to FIG. 1, in some embodiments, automatic speech recognition may require training (i.e., enrollment). In some cases, training an automatic speech recognition model may require an individual speaker to read text or isolated vocabulary. In some cases, a video may include an audio component having an audible verbal content (execution element 128), the contents of which are known a priori by processor 104. Processor 104 may then train an automatic speech recognition model according to training data which includes audible verbal content correlated to known content. In this way, processor 104 may analyze a person's specific voice and train an automatic speech recognition model to the person's speech, resulting in increased accuracy. Alternatively or additionally, in some cases, processor 104 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

With continued reference to FIG. 1, in some embodiments, an automatic speech recognition process may perform voice recognition or speaker identification. As used in this disclosure, "voice recognition" refers to identifying a speaker, from audio content, rather than what the speaker is saying. In some cases, processor 104 may first recognize a speaker of verbal audio content or raw data 116 and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include a user. For example, user may speak within video, but others may speak as well.

With continued reference to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

With continued reference to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content or raw data 116) can be understood as a Markov model for many stochastic purposes.

With continued reference to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

With continued reference to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

With continued reference to FIG. 1, in some embodiments, an automatic speech recognition process may be said to decode speech (i.e., raw data 116). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

With continued reference to FIG. 1, in some embodiments, speech (i.e., audible verbal content or raw data 116) decoding may include considering a set of good candidates of execution element 128 and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

With continued reference to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content or raw data 116) speeds. In some cases, DTW may allow processor 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

With continued reference to FIG. 1, in some embodiments, an automatic speech recognition process may include a neural network. Neural network may include any neural network, for example those disclosed with reference to FIGS. 5-6. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content or raw data 116 over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

With continued reference to FIG. 1, in come embodiments, processor 104 may use a language processing module to find execution element 128 from raw data 116. The language processing module may be configured to extract, from raw data 116 or analyzed raw data 116 using AVSR, ASR or OCR, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams," where all sequences of n consecutive characters are considered. Any or all possible sequences of tokens or words may be stored as "chains," for example for use as a Markov chain or Hidden Markov Model.

With continued reference to FIG. 1, language processing module may operate to produce a language processing model. Language processing model may include a program automatically generated by processor 104 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, cach element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing cach language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, in some embodiments, processor 104 may be configured to analyze raw data 116 using machine vision system to determine execution element 128. For the purposes of this disclosure, a "machine vision system" is a type of technology that enables a computing device to inspect, evaluate and identify still or moving images. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

With continued reference to FIG. 1, in some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 1, alternatively or additionally, identifying a shape or object (execution element 128) in image may include classifying a shape or object (execution element 128) in image to a label of a shape or object in image using an image classifier; the image classifier may be trained using a plurality of images of execution elements. For example and without limitation, machine vision system may use image classifier, wherein an input may include raw data 116 that is analyzed to find execution element, and through a classification algorithm, outputs execution element 128 with a label of outputs execution element based on image training data. The image classifier may be configured to determine which of a plurality of edge-detected shapes is closest to an attribute set of execution element 128 as determined by training using training data and selecting the determined shape as execution element 128. As a non-limiting example, image classifier may be trained with image training data that correlates a plurality of images of execution element 128 to a label of execution element 128. In a non-limiting example, input data of image classifier may include images of products and output data of image classifier may include a name (label) of products. Alternatively, identification of execution element 128 may be performed without using computer vision and/or classification; for instance, identifying execution element 128 may further include receiving, from a user, an identification of execution element 128 in raw data 116. In some embodiments, image training data may be stored in graph database 120. In some embodiments, image training data may be received from one or more users, graph database 120, external computing devices, and/or previous iterations of processing. As a non-limiting example, image training data may include instructions from a user, who may be an expert user, a past user in embodiments disclosed herein, or the like, which may be stored in memory and/or stored in graph database 120, where the instructions may include labeling of training examples. In some embodiments, image training data may be updated iteratively on a feedback loop. As a non-limiting example, processor 104 may update image training data iteratively through a feedback loop as a function of incoming new raw data 116, or the like.

With continued reference to FIG. 1, in some embodiments, processor 104 may be configured to generate a weighted value of each of a plurality of execution elements 128. For the purposes of this disclosure, a "weighted value" is a numerical value assigned to an execution element that reflects its relative value, importance, or significance. As a non-limiting example, weighted value may include importance of execution elements 128 for solving a technical problem of a user. In another non-limiting example, weighted value may include value of execution elements 128 for delivering a monetary value to a user. In some embodiments, weighted value may be stored in graph database 120. In In some embodiments, weighted value may be retrieved from graph database 120. In some embodiments, weighted value may be assigned to execution elements 128 by a user or be assigned by processor 104 through the use of machine-learning module. For example, and without limitation, first execution element may include weighted value of '5' while second execution element includes weighted value of '10' for a range of 0-10, where '0' may represent execution element 128 having a minimum and/or no importance or value and '10' represents execution element 128 having maximum or high importance or value. In some embodiments, processor 104 may be configured to determine a data extrapolation 136 as a function of weighted value of each of a plurality of execution elements 128. The data extrapolation 136 disclosed herein is further described below. In a non-limiting example, processor 104 may determine data extrapolation 136 for execution elements 128 that includes highest weighted value. For example, and without limitation, if first execution element includes weighted value of '5' and second execution element includes weighted value of '10,' processor 104 may determine data extrapolation 136 for the second execution element. In some embodiments, processor 104 may determine data extrapolation 136 for a set number of execution elements 128 that includes highest weighted value. As a non-limiting example, processor 104 may determine data extrapolation 136 for five execution elements 128 that includes highest weighted value among other execution elements 128. The set number for execution elements 128, in a non-limiting example, may be determined by a user, received from graph database 120 or determined through the use of machine-learning module. Machine-learning module disclosed herein is further described with respect to FIG. 4.

With continued reference to FIG. 1, in some embodiments, processor 104 may be configured to generate or obtain element training data. For the purposes of this disclosure, "element training data" is training data that is used to train an element machine-learning model. In some embodiments, element training data may include correlations between exemplary raw data and exemplary execution elements. In some embodiments, element training data may be consistent with any training data described in the entirety of this disclosure. In some embodiments, element training data may be received from one or more users, graph database 120, external computing devices, and/or previous iterations of processing. As a non-limiting example, element training data may include instructions from a user, who may be an expert user, a past user in embodiments disclosed herein, or the like, which may be stored in memory and/or stored in graph database 120, where the instructions may include labeling of training examples. In some embodiments, element training data may be updated iteratively through a feedback loop. As a non-limiting example, element training data may be updated iteratively through a feedback loop as a function of newly collected raw data 116, execution element 128, output of machine-learning models or classifiers, or the like as described below. In some embodiments, processor 104 may be configured to generate element machine-learning model 148. In a non-limiting example, generating element machine-learning model 148 may include training, retraining, or fine-tuning element machine-learning model 148 using element training data or updated element training data. In some embodiments, processor 104 may be configured to determine execution element 128 from raw data 116 using element machine-learning model 148 (i.e. trained or updated element machine-learning model 148). In a non-limiting example, processor 104 may determine specific code as execution element 128 from computer codes (raw data 116) using element machine-learning model 148. In another non-limiting example, processor 104 may determine a keyword as execution element 128 from a speech of a user (raw data 116) using element machine-learning model 148.

With continued reference to FIG. 1, memory 108 contains instructions configuring processor 104 to determine a data extrapolation 136 of a plurality of execution elements 128. For the purposes of this disclosure, a "data extrapolation" is a set of estimated values or predictions that extend beyond the observed range of the existing data. In some cases, data extrapolation 136 may include a service, product, method (operation datum 132) or the like that can be used to execute execution element 128. In some cases, data extrapolation 136 may include potential future outcomes of executing execution element 128. As a non-limiting example, data extrapolation 136 may include monetary value (execution token datum 140) that can be earned by executing execution element 128. As another non-limiting example, data extrapolation 136 may include possible outcome that can be reached by executing execution element 128. As another non-limiting example, data extrapolation 136 may include potential solution that can be used to solve problems (execution element 128). In some cases, data extrapolation 136 may include an end user and a plurality of characteristics of the end user as described below. In some cases, data extrapolation 136 may include at least an operation datum 132 and execution token datum 140 as described below. In some embodiments, processor 104 may include a statistical and analytical technique to determine data extrapolation 136 of execution elements 128. In some embodiments, data extrapolation 136 may be stored in graph database 120. In some embodiments, data extrapolation 136 may be retrieved from graph database 120. In some embodiments, a user may manually determine data extrapolation 136 of a plurality of execution elements 128 or processor 104 may determine data extrapolation 136 through the use of machine-learning module or extrapolation machine-learning model 152.

With continued reference to FIG. 1, memory 108 contains instructions configuring processor 104 to determine at least an operation datum 132 for a plurality of execution elements 128. For the purposes of this disclosure, an "operation datum" is an element of data extrapolation related to methods employed to the execution of an execution element. As a non-limiting example, operation datum 132 may include a particular product, service or actions recommended for execution element 128 to deliver sufficient value to a user or an end user. As another non-limiting example, operation datum 132 may include a particular program or system that can be used to execute execution element 128. In some embodiments, operation datum 132 may be stored in graph database 120. In some embodiments, operation datum 132 may be retrieved from graph database 120. In some embodiments, a user may manually determine operation datum 132 of a plurality of execution elements 128 or processor 104 may determine operation datum 132 through the use of machine-learning module or extrapolation machine-learning model 152.

With continued reference to FIG. 1, processor 104 may be configured to determine an execution token datum 140 for a plurality of execution elements 128. For the purposes of this disclosure, an "execution token datum" is element of data extrapolation related to a degree of optimality for executing an execution element. As a non-limiting example, execution token datum 140 may include monetary value that can be earned by executing execution element 128. As another non-limiting example, execution token datum 140 may include a rate of how much a technical solution can be solved by executing execution element 128. As a non-limiting example, execution token datum 140 may include monetary loss that can be loss by executing execution element 128. In some embodiments, execution token datum 140 may be stored in graph database 120. In some embodiments, execution token datum 140 may be retrieved from graph database 120. In some embodiments, a user may manually determine execution token datum 140 of a plurality of execution elements 128 or processor 104 may determine execution token datum 140 through the use of machine-learning module or extrapolation machine-learning model 152.

With continued reference to FIG. 1, in some cases, processor 104 may be configured to determine an end user of a plurality of execution elements 128 and determine operation datum 132 as a function of a plurality of characteristics of the end user. For the purposes of this disclosure, an "end user" is the final recipients or entities that interact with a user. In some embodiments, an end user may utilize execution element 128 or data extrapolation 136 generated be a user. As a non-limiting example, an end user may include a client or customer of a user. As another non-limiting example, an end user may include a system, program, device, software application, service, device, or processor other than a user. In some embodiments, end user may be stored in graph database 120. In some embodiments, end user may be retrieved from graph database 120. In some embodiments, a user may manually determine end user of a plurality of execution elements 128 or processor 104 may determine end user through the use of machine-learning module or extrapolation machine-learning model 152. In some embodiments, end user may include characteristics. For the purposes of this disclosure, a "characteristic" of an end user is a feature or attributes of an end user. As a non-limiting example, characteristic of an end user may include an end user's need, concern, desire, risk, opportunity, preference, age, or the like for execution element 128 or data extrapolation 136. As another non-limiting example, characteristic of an end user may include speed, efficiency, capacity, or the like. In a non-limiting example, if an end user of execution element 128 includes a specific capacity, then processor 104 may determine operation datum 132 that accommodates the specific capacity. In another non-limiting example, if an end user of execution element 128 includes a specific age, then processor 104 may determine operation datum 132 that includes products or services that targets the specific age.

With continued reference to FIG. 1, in some embodiments, processor 104 may be configured to determine at least an executor of a plurality of execution elements 128. For the purposes of this disclosure, an "executor" is an entity that executes an execution element. As a non-limiting example, executor may include an employee, technician, or the like that can work to execute execution element 128 to meet execution token datum 140, execute execution element 128 using operation datum 132, or execute execution element 128 to reach or achieve data extrapolation 136. As another non-limiting example, executor may include a system, processor, device, or the like that can execute execution element 128 to meet execution token datum 140, execute execution element 128 using operation datum 132, or execute execution element 128 to reach or achieve data extrapolation 136. In some embodiments, a user may manually determine executor of a plurality of execution elements 128 or processor 104 may determine executor through the use of machine-learning module or extrapolation machine-learning model 152. In some embodiments, processor 104 may determine executor or any data extrapolation 136 described herein using a clustering algorithm. As a non-limiting example, clustering algorithm may include a particle swarm optimization algorithm, a k-means clustering algorithm, any clustering algorithm described in the entirety of this disclosure, or any clustering algorithm that may occur to persons skilled in the art upon reviewing the entirety of this disclosure; k-means clustering algorithms are further described below for exemplary purposes. In a non-limiting example, processor 104 may identify clusters in execution elements 128 or data extrapolations 136, and label the clusters; for instance, execution elements 128 or data extrapolations 136 may be grouped by a clustering algorithm around centroids, and labels may be automatically assigned to centroids and/or may be labeled using user-entered labels for such centroids. In some embodiments, labeled clusters may be used and the correlation of clusters to datasets may be used to train a classifier. In some embodiments, generating training data and training classifier may be simultaneous; for instance, clustering algorithm and/or a classifier using a similar distance metric may be used to associate samples with one or more centroids, which may enable samples to be classified to control datasets associated with such centroids. As a non-limiting example, once clusters or labels are identified or generated, a dataset may be matched to one or the clusters and its label.

With continued reference to FIG. 1, in some embodiments, processor 104 may be configured to determine a concern category for each of a plurality of execution elements 128. For the purposes of this disclosure, a "concern category" is a grouping of execution elements based on a level of concern for an enterprise. In a non-limiting example, concern category may indicate that one team (i.e. executor) of an enterprise can underperform to execute execution element 128 while another is adequately performing. In another non-limiting example, concern category may indicate opportunity for executor to improve executing execution element 128. In another non-limiting example, concern category may indicate a certain executor having strength to execute execution element 128. In another non-limiting example, concern category may indicate a possibility of execution element 128 to fail (i.e. danger) or succeed (i.e. strength). As a non-limiting example, concern category may include danger, opportunity, strength category, or the like. Concern categories may include threshold values that differentiate categories. For example, threshold values may differentiate between dangers, opportunity, and strength categories. In some instances, concern categories may be represented by fuzzy set. Threshold metrics may be determined by scoring execution element 128 with numeric values ranging from 0 to 1, 0 to 10, 0 to 100, or any suitable range. Dangers may be the lowest scored category, indicating that execution element 128 associated therewith may cause detriment to the enterprise. Opportunity may be a middle-scored category, indicating that execution element 128 associated therewith may require improvement to become a strength, or would eventually enter the danger category after a period of time. Strength may be a high scored category, indicating execution element 128 associated therewith may be a strength of the enterprise. In some embodiments, concern category may be stored in graph database 120. In some embodiments, concern category may be retrieved from graph database 120. In some embodiments, a user may manually determine concern category.

Still referring to FIG. 1, execution element 128 may be classified to concern category using a machine learning model, such as a classifier, to organize the concern category classes. Classifiers as described throughout this disclosure may be configured to output at least a datum that labels or otherwise identifies a set of data that are clustered together, found to be close under a distance metric as described below, or the like. For example, processor 104 may generate and train a concern category classifier configured to receive execution element 128 and output concern category class. Processor 104 and/or another device may generate a classifier using a classification algorithm, defined as a processes whereby a processor 104 derives a classifier from training data. In some embodiments, concern category classifier training data may include activities associated with a concern category class. In some embodiments, concern category classifier training data may be stored in graph database 120. In some embodiments, concern category classifier training data may be received from one or more users, graph database 120, external computing devices, and/or previous iterations of processing. As a non-limiting example, concern category classifier training data may include instructions from a user, who may be an expert user, a past user in embodiments disclosed herein, or the like, which may be stored in memory and/or stored in graph database 120, where the instructions may include labeling of training examples. In some embodiments, concern category classifier training data may be updated iteratively on a feedback loop. As a non-limiting example, processor 104 may update concern category classifier training data iteratively through a feedback loop as a function of raw data 116, execution element 128, output of element machine-learning model 148, image classifier, or the like. In a non-limiting example, generating concern category classifier may include training, retraining, or fine-tuning concern category classifier using concern category classifier training data or updated concern category classifier training data. In some embodiments, generating training data and training machine-learning models may be simultaneous.

With continued reference to FIG. 1, in some embodiments, market data statistics may be derived from a web crawler. For example, a user may submit a plurality of websites for the web crawler to search to extract market data statistics from and correlate to execution element 128, such as aesthetics based on price, popularity, bid history search criteria, and the like. Additionally, the web crawler function may be configured to search for and/or detect one or more data patterns. A data pattern may include repeating data statistics related to execution element 128. For example, users tend to be more active earlier in the week. In some embodiments, the web crawler may be configured to determine the relevancy of a data pattern. Relevancy may be determined by a relevancy score. In some embodiments, relevancy score may be considered a unique ability identified by outlier cluster and may be described in further detail in U.S. patent application Ser. No. 18/141,296, filed on Apr. 28, 2023, entitled "SYSTEMS AND METHODS FOR DATA STRUCTURE GENERATION,"the entirety of which is incorporated by reference. As used in this disclosure. An "outlier cluster" is an attribute cluster with an impact metric that differs substantially from a population average. In some embodiments, outlier cluster and execution element 128 may be classified to a concern category. In some embodiments, execution element 128 may be classified to multiple concern categories. In some instances, some concern categories may be more similar to outlier cluster. And outlier clusters may be represented as vectors. A degree of similarity may be determined as a function of a geometric relationship between vector representations. In some instances, a machine learning model may be utilized to determine which concern category is most closely related to outlier cluster.

Still referring to FIG. 1, concern category classifier may use data to prioritize the order in which execution element 128 is scheduled. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Additionally disclosure related to a concern category disclosed herein may be found in U.S. patent application Ser. No. 18/142,819, filed on May 3, 2023, entitled "METHOD AND AN APPARATUS FOR FUNCTIONAL MODEL GENERATION,", the entirety of which is incorporated by reference.

With continued reference to FIG. 1, processor 104 may be configured to generate any classifier disclosed herein using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 200, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, in some cases, determining data extrapolation 136 may include determining data extrapolation 136 using linear regression techniques. As a non-limiting example, data extrapolation 136 may include operation datum 132, execution token datum 140, end user, executor, or the like. Processor 104 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 1, in some embodiments, processor 104 may be configured to determine data extrapolation 136 of execution element 128 using a bootstrap process. In some embodiments, processor 104 may determine execution element 128 from raw data 116 using boot strap process. As used in the current disclosure, a "bootstrap process" is a resampling technique used to estimate the sampling distribution of a statistic or to assess the uncertainty associated with a sample. The bootstrap process may involve generating multiple resamples of the original dataset by randomly sampling with replacement. Each resample is the same size as the original dataset, but some observations may appear multiple times, while others may be left out. This process allows for the creation of a pseudo-population from which statistical estimates can be derived. Once the resamples are obtained, the desired statistic is computed for each resample. This statistic can be a mean, median, standard deviation, correlation coefficient, or any other relevant measure. By repeating this resampling process numerous times (often several thousand), a distribution of the statistic is obtained, known as the bootstrap distribution. In the current case, bootstrap process may begin by generating multiple resamples of the dataset. For example, each resample may consist of paired samples of raw data 116 or execution element 128 or data extrapolation 136, any other data mentioned herein. These resamples are created by randomly selecting instances from the first and second dataset with replacement, ensuring that both textual and image data are kept together in each resample. For each resample, execution element 128 or data extrapolation 136 pairs are analyzed together to explore the relationship or association between them. Various techniques can be applied based on the specific task or objective. The strength of the relationship or association between raw data 116, execution element 128 or data extrapolation 136 can be assessed by measuring performance metrics or statistical measures. For classification tasks, accuracy, precision, recall, or F1-score can be computed. Alternatively, correlation coefficients, mutual information, or other statistical measures can be used to quantify the association between the two data types. IF the strength of the relationship or association between raw data 116, execution element 128 or data extrapolation 136 is above a pre-determined threshold then a first association may be created between raw data 116, execution element 128 or data extrapolation 136. The bootstrap process may be repeated multiple times, generating different resamples each time. This repetition allows for the estimation of the variability and uncertainty in the relationship or association metrics. By analyzing the results across the resampled datasets, confidence intervals can be constructed, hypothesis tests can be performed, or stability assessments can be made to evaluate the significance and robustness of the relationship.

With continued reference to FIG. 1, processor 104 may determine data extrapolation 136 using a Monte Carlo simulation. "Monte Carlo simulation" may refer to a "Monte Carlo method," "Monte Carlo experiment," and/or executing a "Monte Carlo algorithm." A Monte Carlo simulation may be a mathematical technique that may generate variables, numerical values, and the like, for modeling risk, uncertainty, etc. of a certain system using a stochastic simulation process. Monte Carlo simulations may encompass a range of algorithms and mathematical analysis techniques such as Markov Model Monte Carlo (MMMC) simulations, McKean-Vlasov processes, Monte Carlo localization, among other probabilistic heuristics. As used herein, a Monte Carlo simulation may generate random data extrapolation 136, wherein each data extrapolation 136 may represent a sufficiently good solution to an optimization problem, wherein the solution is data extrapolation 136 represented by a numerical value, 2D polar coordinate, vector, matrix, or the like, that represents data extrapolation 136. Each generated data extrapolation 136 may be associated with raw data 116 or execution element 128. And thus, each data extrapolation 136 may have values of data extrapolation 136 to perform a randomly generate data extrapolation 136. Each data extrapolation 136 may then have associated with it a "value of data extrapolation" variable, wherein the value of data extrapolation 136 is a numerical value that represents the data extrapolation 136 for raw data 116 or execution element 128. Data extrapolation 136 can be plotted and/or mapped as a function of their value of data extrapolation 136 and a machine-learning process may select data extrapolation 136 based on some criterion, for instance the data extrapolation 136 with the most minimized value of data extrapolation 136, and select those data extrapolation 136 as inputs to subsequent calculations.

A Monte Carlo simulation may be a class of computation algorithms used by a machine-learning process that may rely on repeated stochastic sampling to obtain numerical results, for instance generating random spatial locations within a confined space on a map, wherein each spatial location can have a numerical parameter describing it. Monte Carlo simulations may be performed with dynamic systems that may be coupled with an analysis method, for instance an unknown data extrapolation 136 relative to raw data 116 or execution element 128, wherein raw data 116 or execution element 128 is determine by sampling within the simulation. In non-limiting illustrative examples, a machine-learning process, such as but not limited to a supervised machine-learning process, may accept generated candidate solutions from a Monte Carlo simulation, as described above, and calculate refined data extrapolation 136 to the candidate data extrapolation 136, wherein the predicted paths may contain numerical results from the simulated data extrapolation 136. The Monte Carlo simulation may generate many candidate template data extrapolation 136, where a machine-learning process/model may narrow the number of data extrapolation 136 based on raw data 116 or execution element 128. Such a machine-learning process may iteratively generate selected data extrapolation 136 based on a criterion, for instance and without limitation raw data 116 or execution element 128, wherein when it is time for data extrapolation 136 to be used for purposes of generating directed graph 144, a machine-learning process may retrieve data extrapolation 136.

With continued reference to FIG. 1, in a non-limiting example of generating data extrapolation 136 using Monte Carlo simulator, raw data 116 or execution element 128 may include launching new raw data 116 or execution element 128. Monte Carlo simulator may run a plurality of simulations, with each simulation using a different set of random inputs based on the estimated probability distributions of each variable. For example, and without limitation, the resulted simulation may include a 70% chance that the product will generate a profit of at least $100,000, but may also include a 20% chance that the product will result in a loss of $50,000, or more.

With continued reference to FIG. 1, in some embodiments, processor 104 may include a machine learning model to improve accuracy of determining optimal decision making parameters. In some embodiments, the machine learning model may be consistent with any machine learning model described in the entirety of this disclosure. In some embodiments, the machine learning model may determine initial set of parameters, where the set of parameter may be initially determined. In some embodiments, the initial set of parameters may be modified using random noise, where the random noise may be added to the parameters to simulate real-world variability. In some embodiments, a range of parameter values may be selected to ensure a broad exploration of the parameter space. In some embodiments, machine learning model may be rerun with the modified parameters to generate a new set of outcomes. In some embodiments, the machine learning model may compare the model result against second set of training data to determine parameter for better accuracy for decision making of apparatus 100. The noise that is introduced may be obtained by modeling a time series of data and finding the expected noise from that data. In some embodiments, the machine learning model may be implemented in Monte Carlo simulator.

With continued reference to FIG. 1, in some embodiments, processor 104 may be configured to generate or obtain extrapolation training data. For the purposes of this disclosure, "extrapolation training data" is training data that is used to train an extrapolation machine-learning model. In some embodiments, extrapolation training data may include correlations between exemplary execution extrapolations and exemplary data extrapolations. In some embodiments, extrapolation training data may be consistent with any training data described in the entirety of this disclosure. In some embodiments, extrapolation training data may be received from one or more users, graph database 120, external computing devices, and/or previous iterations of processing. As a non-limiting example, extrapolation training data may include instructions from a user, who may be an expert user, a past user in embodiments disclosed herein, or the like, which may be stored in memory and/or stored in graph database 120, where the instructions may include labeling of training examples. In some embodiments, extrapolation training data may be updated iteratively through a feedback loop. As a non-limiting example, extrapolation training data may be updated iteratively through a feedback loop as a function of newly collected raw data 116, execution element 128, data extrapolation 136, output of machine-learning models or classifiers, output of element machine-learning model 148, or the like. In some embodiments, processor 104 may be configured to generate extrapolation machine-learning model 152. In a non-limiting example, generating extrapolation machine-learning model 152 may include training, retraining, or fine-tuning extrapolation machine-learning model 152 using extrapolation training data or updated extrapolation training data. In some embodiments, processor 104 may be configured to determine data extrapolation 136 of a plurality of execution elements 128 using extrapolation machine-learning model 152 (i.e. trained or updated extrapolation machine-learning model 152). In a non-limiting example, processor 104 may determine that execution element 128 may deliver monetary value of $300,000 using extrapolation machine-learning model 152. In another non-limiting example, processor 104 may determine that execution element 128 may solve a particular technical problem using extrapolation machine-learning model 152.

With continued reference to FIG. 1, in some embodiments, processor 104 may be configured to generate a confidence level of data extrapolation 136. For the purposes of this disclosure, a "confidence level" is a representation of a certainty or accuracy of a data extrapolation of an execution element. Confidence level may be expressed as a numerical range. For instance, and without limitation, a confidence level may be represented by a numerical value ranging between 0% and 100%. For example, and without limitation, data extrapolation 136 that includes confidence level of 99% may be considered highly certain and thus reliable. Contrastingly, data extrapolation 136 that includes confidence level of 5% may be considered highly uncertain and thus unreliable. In some embodiments, end user may be stored in graph database 120. In some embodiments, end user may be retrieved from graph database 120. In some embodiments, a user may manually determine end user of a plurality of execution elements 128 or processor 104 may determine end user through the use of machine-learning module or extrapolation machine-learning model 152. In a non-limiting example, processor 104 may compare data extrapolation 136 and exemplary data extrapolations 136 and their exemplary confidence levels and determine confidence level of data extrapolation 136 as a function of the comparison. In another non-limiting example, processor 104 may determine confidence level using scoring algorithms. In some embodiments, processor 104 may be configured to generate a directed graph 144 as a function of confidence level of data extrapolation 136. As a non-limiting example, processor 104 may generate directed graph using data extrapolation 136 that has exceeded a threshold. The threshold can be generated manually by a user or determined by a processor 104 using a machine-learning module.

With continued reference to FIG. 1, memory 108 contains instructions configuring processor 104 to generate a directed graph as a function of data extrapolation 136. For the purposes of this disclosure, a "directed graph" is a data structure that models a set of objects and the relationships between them. Directed graph 144 may include nodes or also called vertices. For the purposes of this "nodes" are the units in a directed graph, representing distinct entities or points in the system. Each node can have zero or more directed edges emanating from it. As a non-limiting example, nodes may include execution element 128. For the purposes of this disclosure, "directed edges" are the connections between nodes of a directed graph. As a non-limiting example, an edge from node A to node B indicates that there is a relationship from A to B. As a non-limiting example, directed edges may include operation datum 132 or any data extrapolation 136 disclosed herein. Directed graph 144 includes an ordered series of a plurality of execution elements 128 connected using at least an operation datum 132. In a non-limiting example, each of plurality of execution elements 128 may be a node of directed graph 144 and operation datum 132 may be an edge of the nodes. As a non-limiting example, processor 104 may generate ordered series of execution elements 128 as a function of weighted value of execution elements 128. For example, and without limitation, processor 104 may order execution elements 128 from the highest weighted value and lowest weighted value or vice versa. As another non-limiting example, processor 104 may generate ordered series of execution elements 128 as a function of confidence level. For example, and without limitation, processor 104 may order execution elements 128 from the highest confidence level and lowest confidence level. In some embodiments, directed graph 144 may be stored in graph database 120. In some embodiments, directed graph 144 may be retrieved from graph database 120. In some embodiments, user may manually generate directed graph 144 or processor 104 may generate directed graph 144 using machine-learning module. In some embodiments, processor 104 may be configured to generate directed graph 144 using convolutional neural network, stochastic analysis, probabilistic analysis, or the like described in the entirety of this disclosure. In some embodiments, processor 104 may be configured to determine a graph generation algorithm or machine-learning model to generate directed graph 144. As a non-limiting example, graph generation algorithm may include random graph models, topology-based algorithms, or the like. In some embodiments, processor 104 may be configured to calibrate machine-learning models, algorithms, or neural networks using temperature scaling. For the purposes of this disclosure, "temperature scaling" is a post-processing technique to adjust the output probabilities of a neural network. As a non-limiting example, processor 104 may be configured to train a neural network for a classification task, obtain raw logits from the network for each class, use a validation set to find an optimal temperature scaling factor, and apply the learned scaling factor to the logits during inference to adjust the probabilities.

With continued reference to FIG. 1, in some embodiments, processor 104 may be configured to convert directed graph 144 to linguistic terms 156. For the purposes of this disclosure, a "linguistic term" is a word or a set of words. As a non-limiting example, linguistic terms 156 may include a narrative of directed graph 144, execution element 128 or data extrapolation 136. In some embodiments, a user may manually generate linguistic terms 156. In some embodiments, linguistic terms 156 may be stored in graph database 120. In some embodiments, linguistic terms 156 may be retrieved from graph database 120.

With continued reference to FIG. 1, in some embodiments, processor 104 may be configured to convert directed graph 144 into a plurality of linguistic terms 156 using generative artificial intelligence 160. In some embodiments, processor 104 may be configured to decompose directed graph 144 into text elements. As a non-limiting example, if directed graph 144 includes first execution element and second execution element connected with operation datum 132, directed graph 144 may be broken down to 'first execution element is connected with second execution element using operation datum 132.' As another non-limiting example, if directed graph 144 includes second execution element and third execution element connected with operation datum 132, directed graph 144 may be broken down to 'second execution element does operation datum 132 to do second execution element.' In some embodiments, user may manually decompose directed graph 144 or processor 104 may decompose directed graph 144 through the use of machine-learning module, language processing module, or the like. In some embodiments, processor 104 may obtain a template from graph database 120 to decompose directed graph 144 to text elements to convert directed graph 144 to linguistic terms 156 using generative AI or LLM.

With continued reference to FIG. 1, in one or more embodiments, processor 104 may implement one or more aspects of "generative artificial intelligence (AI)," a type of AI that uses machine learning algorithms to create, establish, or otherwise generate data such as, without limitation, linguistic terms and/or the like in any data structure as described herein (e.g., text, image, video, audio, among others) that is similar to one or more provided training examples. In an embodiment, machine learning module described herein may generate one or more generative machine learning models that are trained on one or more set of exemplary linguistic terms. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

With reference to FIG. 1, in some cases, generative machine learning models may include one or more generative models. As described herein, "generative models" refers to statistical models of the joint probability distribution P(X, Y) on a given observable variable x, representing features or data that can be directly measured or observed (e.g., execution element 128 or directed graph 144) and target variable y, representing the outcomes or labels that one or more generative models aims to predict or generate (e.g., linguistic terms 156). In some cases, generative models may rely on Bayes theorem to find joint probability; for instance, and without limitation, Naïve Bayes classifiers may be employed by computing device to categorize input data such as, without limitation, directed graph 144, execution element 128 or data extrapolation 136 into different labels such as, without limitation, linguistic terms 156.

In a non-limiting example, and with reference to FIG. 1, one or more generative machine learning models may include one or more Naïve Bayes classifiers generated, by computing device, using a Naïve bayes classification algorithm. In some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIG. 4.

With continued reference to FIG. 1, in an embodiment, discriminator may include one or more discriminative models, i.e., models of conditional probability P(Y|X=x) of target variable Y, given observed variable X. In an embodiment, discriminative models may learn boundaries between classes or labels in given training data. In a non-limiting example, discriminator may include one or more classifiers as described in further detail below with reference to FIG. 4 to distinguish between different categories similar pair of contradictory terms, or states e.g., TRUE vs. FALSE within the context of generated data such as, without limitations, linguistic terms 156, and/or the like. In some cases, computing device may implement one or more classification algorithms such as, without limitation, Support Vector Machines (SVM), Logistic Regression, Decision Trees, and/or the like to define decision boundaries.

In a non-limiting example, and with reference to FIG. 1, generator of GAN may be responsible for creating synthetic data that resembles real linguistic terms 156. In some cases, GAN may be configured to receive execution element 128, data extrapolation 136 or directed graph 144 such as, without limitation, products, codes, services, systems, methods or the like, as input and generates corresponding linguistic terms 156 containing information describing or evaluating the performance of one or more execution element 128, data extrapolation 136 or directed graph 144. On the other hand, discriminator of GAN may evaluate the authenticity of the generated content by comparing it to real linguistic terms

156, for example, discriminator may distinguish between genuine and generated content and providing feedback to generator to improve the model performance.

With continued reference to FIG. 1, in other embodiments, one or more generative models may also include a variational autoencoder (VAE). As used in this disclosure, a "variational autoencoder" is an autoencoder (i.e., an artificial neural network architecture) whose encoding distribution is regularized during the model training process in order to ensure that its latent space includes desired properties allowing new data sample generation. In an embodiment, VAE may include a prior and noise distribution respectively, trained using expectation-maximization meta-algorithms such as, without limitation, probabilistic PCA, sparse coding, among others. In a non-limiting example, VEA may use a neural network as an amortized approach to jointly optimize across input data and output a plurality of parameters for corresponding variational distribution as it maps from a known input space to a low-dimensional latent space. Additionally, or alternatively, VAE may include a second neural network, for example, and without limitation, a decoder, wherein the "decoder" is configured to map from the latent space to the input space.

In a non-limiting example, and with reference to FIG. 1, VAE may be used by computing device to model complex relationships between execution element 128, data extrapolation 136 or directed graph 144 *e*. In some cases, VAE may encode input data into a latent space, capturing linguistic terms 156. Such encoding process may include learning one or more probabilistic mappings from observed execution element 128, data extrapolation 136 or directed graph 144 to a lower-dimensional latent representation. Latent representation may then be decoded back into the original data space, therefore reconstructing the execution element 128, data extrapolation 136 or directed graph 144. In some cases, such decoding process may allow VAE to generate new examples or variations that are consistent with the learned distributions.

With continued reference to FIG. 1, in some embodiments, one or more generative machine learning models may be trained on a plurality of audio or visual data as described herein, wherein the plurality of audio or visual data may provide visual/acoustical information that generative machine learning models analyze to understand the dynamics of image, video, record of call, or the like. In some cases, such data may help generative machine learning models to learn appropriate language and tone for providing linguistic terms 156. Additionally, or alternatively, one or more generative machine learning models may utilize one or more predefined templates representing, for example, and without limitation, correct linguistic terms 156. In some cases, one or more generative machine learning models may also be applied by computing device to edit, modify, or otherwise manipulate existing data or data structures.

With continued reference to FIG. 1, in some embodiments, processor 104 may be configured to converted directed graph 144 to linguistic terms 156 or generate linguistic terms 156 using large language model. Large language model may be a type of generative AI. A "large language model," as used herein, is a deep learning algorithm that can recognize, summarize, translate, predict and/or generate text and other content based on knowledge gained from massive datasets. LLMs may be trained on large sets of data; for example, training sets may include greater than 1 million words. Training sets may be drawn from diverse sets of data such as, as non-limiting examples, novels, blog posts, articles, emails, and the like. Training sets may include a variety of subject matters, such as, as nonlimiting examples, medical tests, romantic ballads, beat poetry, emails, advertising documents, newspaper articles, and the like. LLMs, in some embodiments, may include GPT, GPT-2, GPT-3, and other language processing models. LLM may be used to augment the text in an article based on a prompt. Training data may correlate elements of a dictionary related to linguistics, as described above, to a prompt. LLM may include a text prediction based algorithm configured to receive an article and apply a probability distribution to the words already typed in a sentence to work out the most likely word to come next in augmented articles. For example, if the words already typed are "Nice to meet," then it is highly likely that the word "you" will come next. LLM may output such predictions by ranking words by likelihood or a prompt parameter. For the example given above, the LLM may score "you" as the most likely, "your" as the next most likely, "his" or "her" next, and the like.

With reference to FIG. 1, LLM may include an attention mechanism, utilizing a transformer as described further below. An "attention mechanism," as used herein, is a part of a neural architecture that enables a system to dynamically highlight relevant features of the input data. In natural language processing this may be a sequence of textual elements. It may be applied directly to the raw input or to its higher-level representation. An attention mechanism may be an improvement to the limitation of the Encoder-Decoder model which encodes the input sequence to one fixed length vector from which to decode the output at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of position in a source sentence where the most relevant information is concentrated. LLM may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation. In some embodiments, LLM may include encoder-decoder model incorporating an attention mechanism.

With reference to FIG. 1, LLM may include a transformer architecture. In some embodiments, encoder component of LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of position in a source sentence where the most relevant information is concentrated. LLM may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation.

With reference to FIG. 1, an attention mechanism may include generalized attention self-attention, multi-head attention, additive attention, global attention, and the like. In generalized attention, when a sequence of words or an image is fed to LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM may pick up particular parts at different positions in the input sequence and over time compute an initial composition of the output sequence. In multi-head attention, LLM may include a transformer model of an attention mechanism. Attention mechanisms, as described above, may provide context for any position in the input sequence. For example, if the input data is a natural language sentence, the transformer does not have to process one word at a time. In multi-head attention, computations by LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, the LLM may learn to associate the word "you," with "how" and "are." It's also possible that LLM learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may be multiplies using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filed with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the SoftMax of this matrix is taken, the negative infinities will be zeroed out; this leaves "zero" attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classes will be of size 10,000. The output of this classifier may be fed into a SoftMax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token. In some embodiment, decoder may be stacked N layers high, with each layer taking in inputs from the encoder and layers before it. Stacking layers may allow LLM to learn to extract and focus on different combinations of attention from its attention heads.

With continued reference to FIG. 1, in some embodiments, LLM may be specifically trained using large language model (LLM) training data. In some embodiments, LLM training data may include correlations between exemplary directed graphs and exemplary linguistic terms. LLM training data may include correlations between text data representing directed graphs and exemplary linguistic terms. In some embodiments, LLM training data may include a set of data that is in user's voice, email, or the like to mimic them. In some embodiments, LLM training data may be consistent with any training data described in the entirety of this disclosure. In some embodiments, LLM training data may be received from one or more users, graph database 120, external computing devices, and/or previous iterations of processing. As a non-limiting example, LLM training data may include instructions from a user, who may be an expert user, a past user in embodiments disclosed herein, or the like, which may be stored in memory and/or stored in graph database 120, where the instructions may include labeling of training examples. In some embodiments, LLM training data may be updated iteratively through a feedback loop. As a non-limiting example, LLM training data may be updated iteratively through a feedback loop as a function of newly collected raw data 116, execution element 128, data extrapolation 136, output of machine-learning models or classifiers, directed graph 144, or the like. In some embodiments, processor 104 may be configured to generate LLM. In a non-limiting example, generating LLM may include training, retraining, or fine-tuning LLM using LLM training data or updated LLM training data. In some embodiments, processor 104 may be configured to generate linguistic terms 156 using LLM (i.e. trained or updated LLM).

With continued reference to FIG. 1, in some embodiments, processor 104 may be configured to transmit directed graph 144 and/or linguistic term 156 to remote device 124. In some embodiments, processor 104 may be configured to transmit execution element 128, data extrapolation 136, confidence level, or the like. The remote device disclosed herein is further described above.

Figure 2:
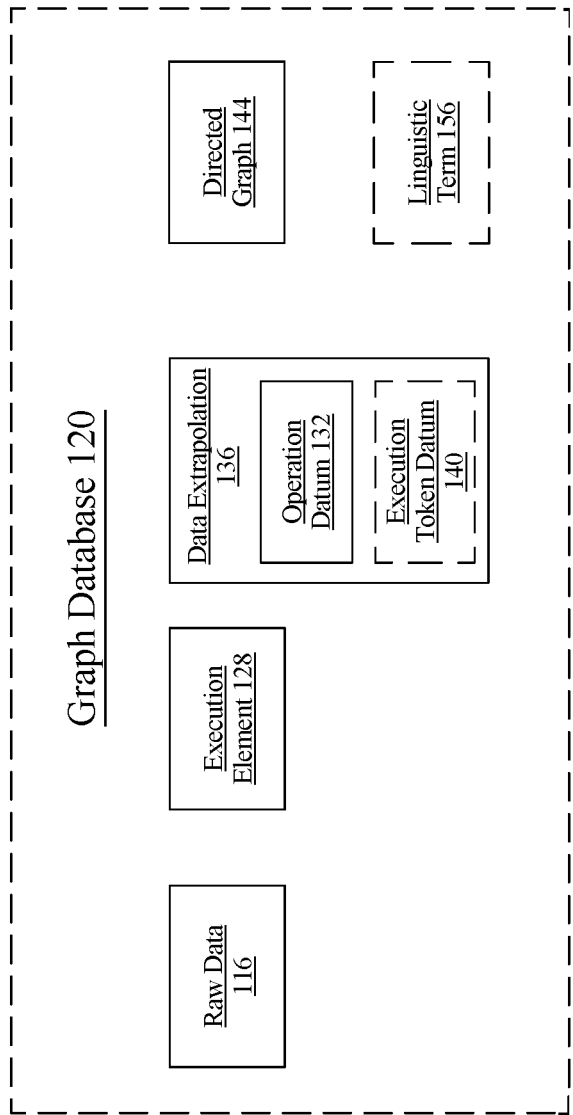
FIG. 2 illustrates a block diagram of an exemplary graph database.

Referring now to FIG. 2, a block diagram of exemplary graph database 120 is illustrated. Graph database 120 may include raw data 116, execution element 128, data extrapolation 136, directed graph 144, linguistic term 156, operation datum 132, execution token datum 140, characteristics of end user, executor of execution element 128, input and/or output of machine-learning models disclosed in this disclosure, weighted value, output of AVSR, ASR, OCR, machine vision system, image classifier, element machine-learning model 148, linear regression, bootstrap process, Monte Carlo simulation, extrapolation machine-learning model 152, clustering algorithm, confidence level, or the like.

Figure 3:
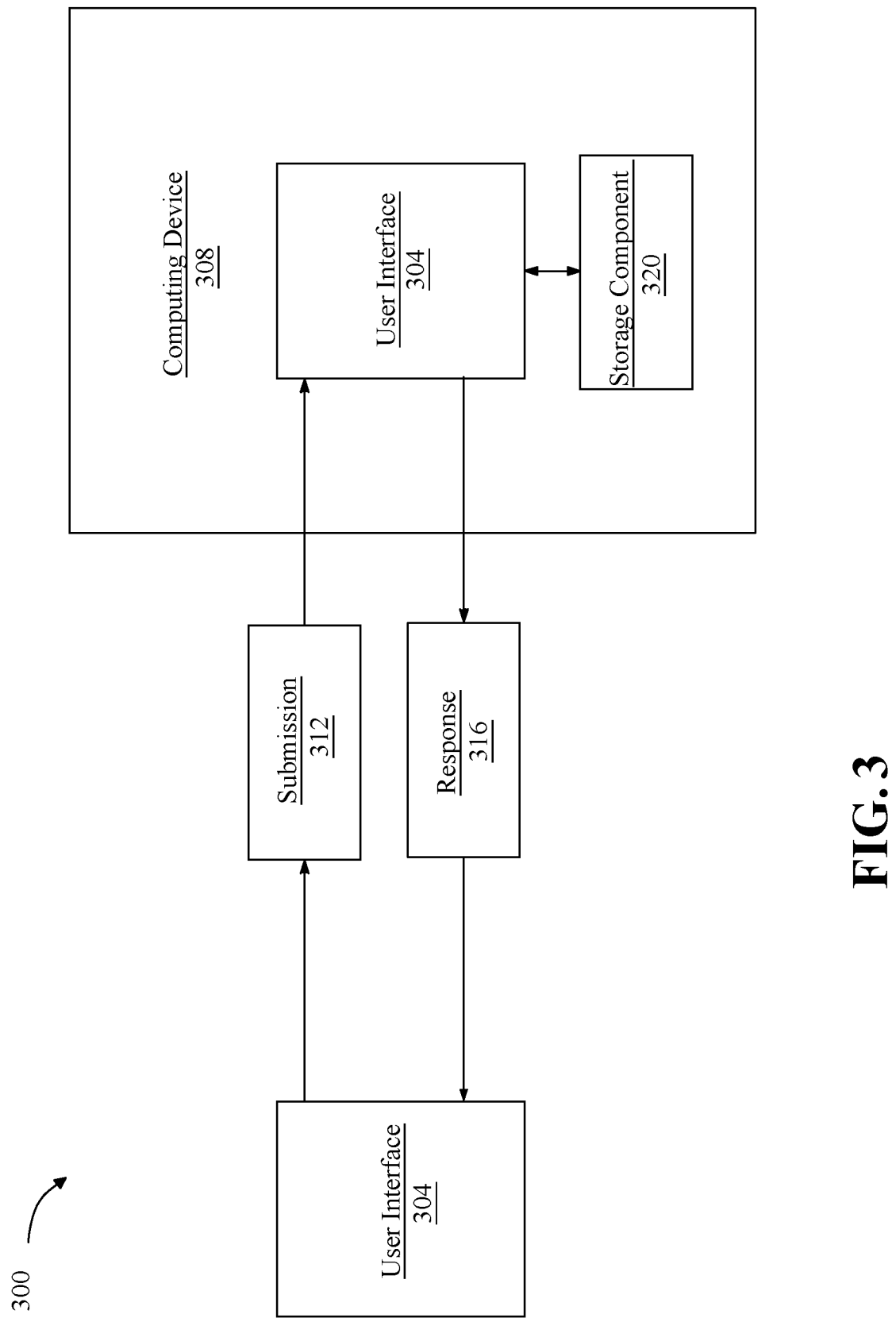
FIG. 3 illustrates a block diagram of an exemplary chatbot system.

Referring to FIG. 3, a chatbot system 300 is schematically illustrated. According to some embodiments, a user interface 304 may be communicative with a computing device 308 (or processor 104) that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with user device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 308 to the chatbot, and a response 316, from the chatbot to the user interface 304. In many cases, one or both submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor. In some embodiments, processor processes a submission 312 using one or more keyword recognition, pattern matching, and natural language processing. In some embodiments, processor employs real-time learning with evolutionary algorithms. In some cases, processor may retrieve a pre-prepared response from at least a storage component 320, based upon submission 312. Alternatively or additionally, in some embodiments, processor communicates a response 316 without first receiving a submission 312, thereby initiating conversation. In some cases, processor communicates an inquiry to user interface 304; and the processor is configured to process an answer to the inquiry in a following submission 312 from the user interface 304. In some cases, an answer to an inquiry present within a submission 312 from a user device 304 may be used by computing device 308 as an input to another function.

With continued reference to FIG. 3, a chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the users entry into the chatbot as a function of a chatbot input. As used in the current disclosure, "Chatbot input" is any response that a candidate or employer inputs in to a chatbot as a response to a prompt or question.

With continuing reference to FIG. 3, computing device 308 may be configured to the respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 308 may generate two or more decision trees, which may overlap; for instance, a root node of one tree may connect to and/or receive output from one or more terminal nodes of another tree, intermediate nodes of one tree may be shared with another tree, or the like.

With continued reference to FIG. 3, computing device 308 may build decision tree by following relational identification; for example, relational indication may specify that a first rule module receives an input from at least a second rule module and generates an output to at least a third rule module, and so forth, which may indicate to computing device 308 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 308 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 3, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 4:
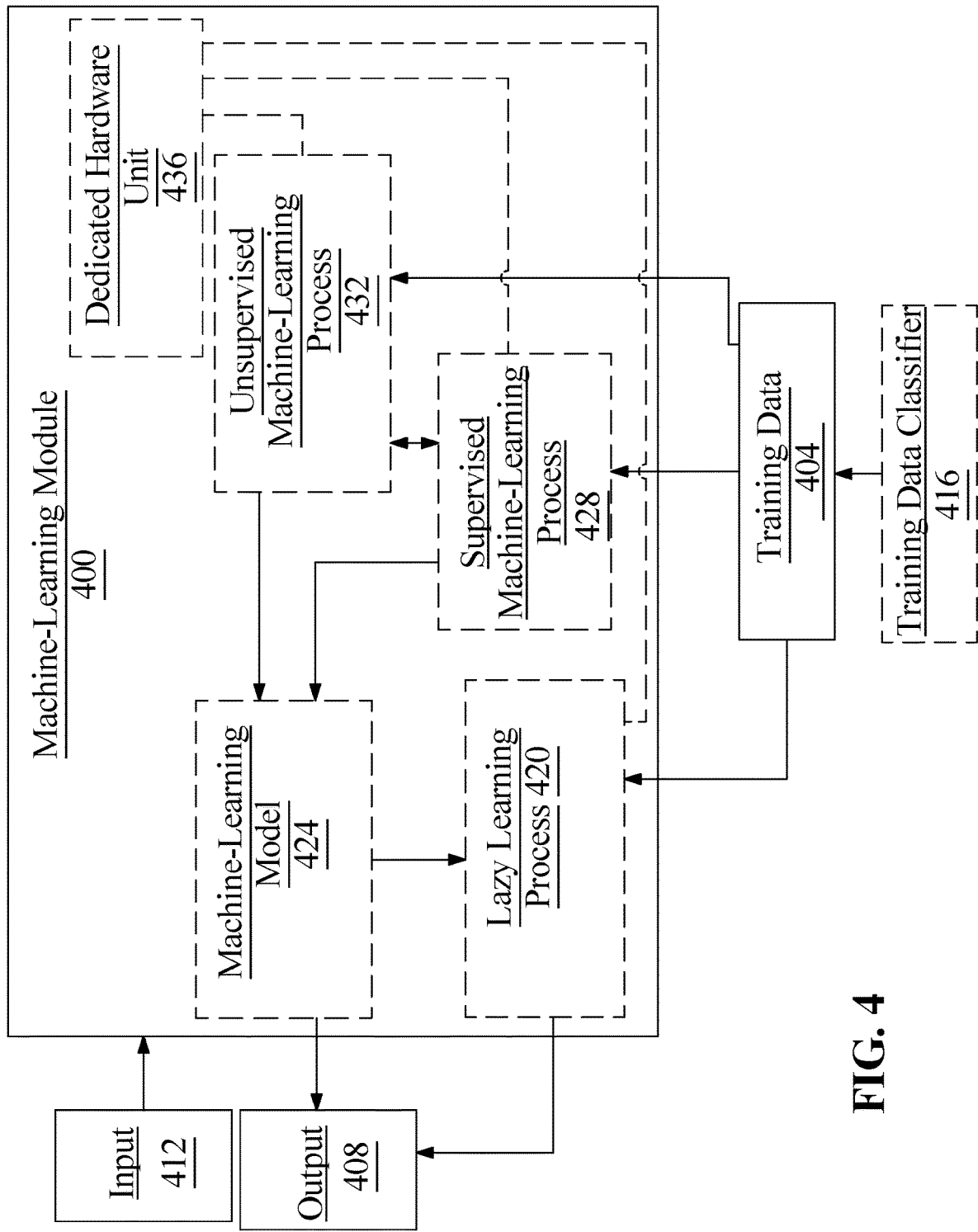
FIG. 4 illustrates a block diagram of an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine-learning processes. A "machine-learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine-learning software program where the commands to be executed are determined in advance by a user and written in a programming language.

With continued reference to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include raw data 116, execution element 128, data extrapolation 136, directed graph 144, or the like. As a non-limiting example, outputs may include execution element 128, data extrapolation 136, directed graph 144, linguistic term 156, or the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to priority groups. For example, and without limitation, priority groups may include critical, high priority, low priority group, or the like. As another non-limiting example, training data classifier 416 may classify elements of training data to labels of feedback data. For example, and without limitation, labels of feedback data may include 'positive,' 'neutral,' 'negative,' or any category of feedback data thereof. As another non-limiting example, training data classifier 416 may classify elements of training data to a plurality of execution elements 128, wherein each of the plurality of execution elements 128 may include different features of raw data 116. For example, and without limitation, different features of raw data 116 may include different features of users, such as but not limited to user's age, job position, gender, or the like.

With continued reference to FIG. 4, computing device 404 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 404 may then calculate a likelihood table by calculating probabilities of different data entries and classification labels. Computing device 404 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, computing device 404 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [4, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attributel as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine-learning model. Preprocessing may include sanitizing, feature selection, feature scaling, data augmentation and the like.

With continued reference to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, santization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine-learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine-learning model that is trained to predict interpolated pixel values using the training data. As a non-limiting example, a sample input and/or output, such as a sample picture, with sample-expanded data units (e.g. pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine-learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}{:}X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the 25th percentile value and the 40th percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

With continued reference to FIG. 4, machine-learning module 400 may be configured to perform a lazy-learning process 420 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include raw data 116, execution element 128, data extrapolation 136, directed graph 144, or the like as inputs and execution element 128, data extrapolation 136, directed graph 144, linguistic term 156, or the like, as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

With continued reference to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine-learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

With continued reference to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

With continued reference to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

With continued reference to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g. multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
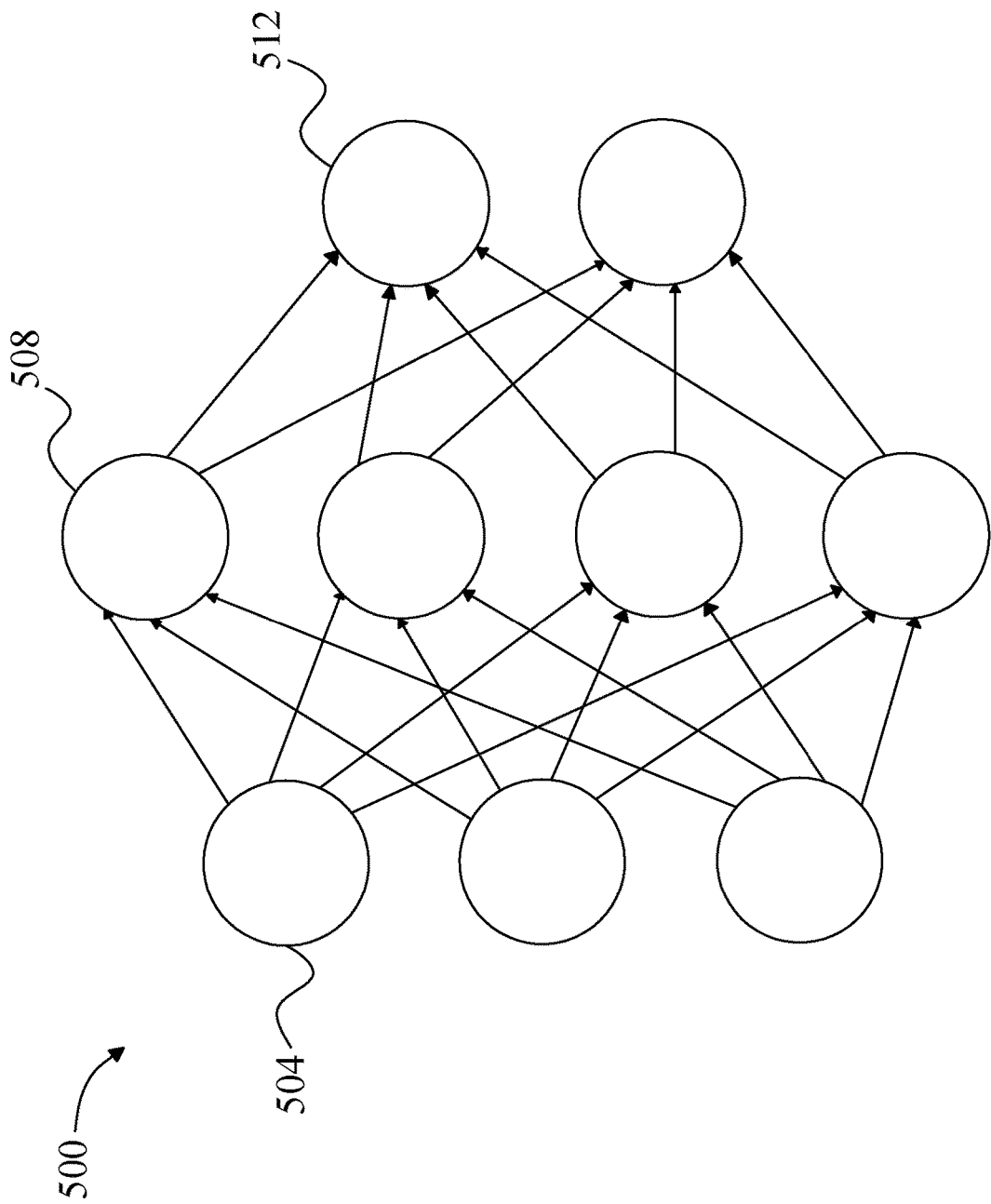
FIG. 5 illustrates a diagram of an exemplary nodal network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
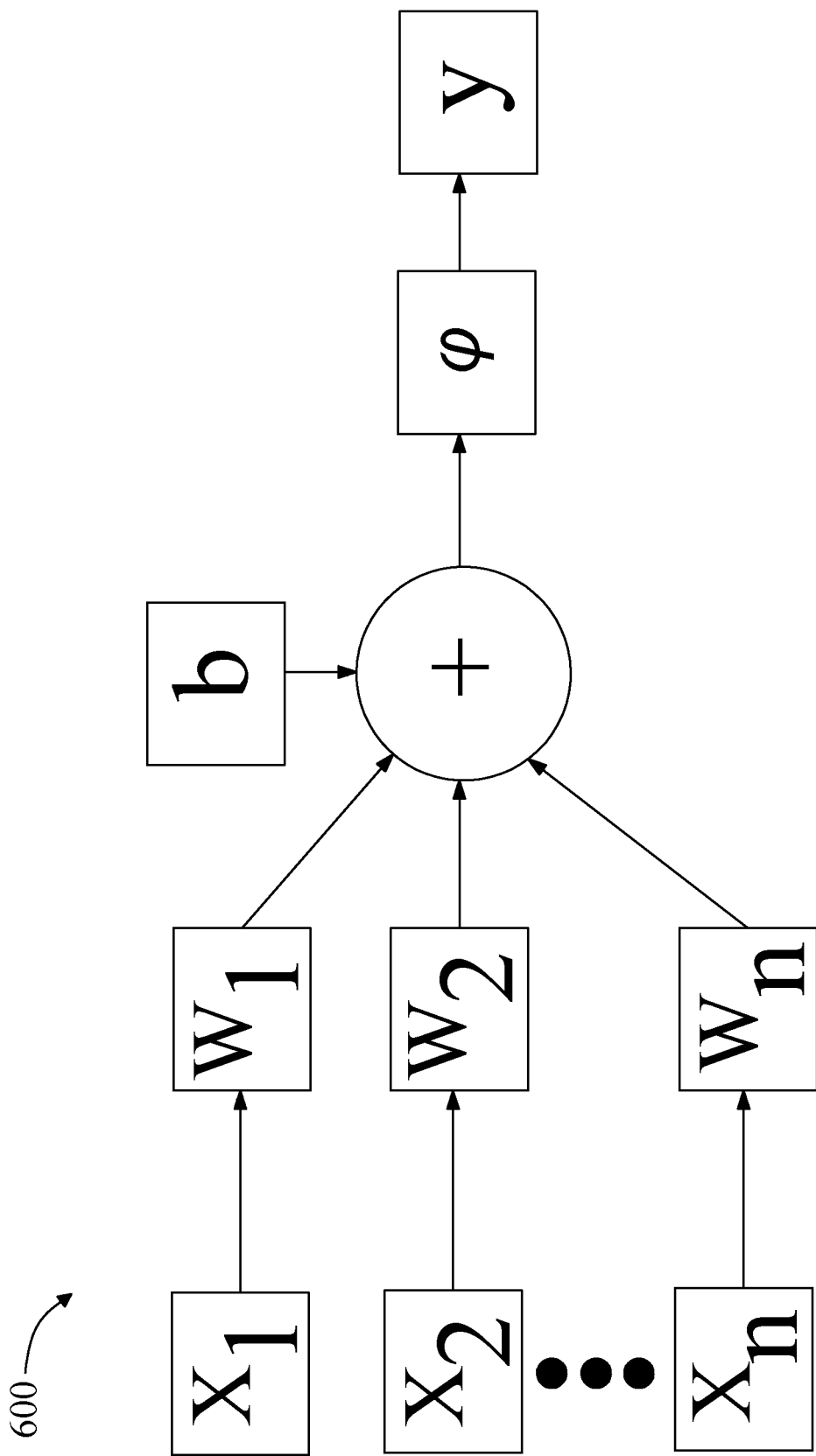
FIG. 6 illustrates a block diagram of an exemplary node.

Referring now to FIG. 6, an exemplary embodiment of a node 600 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function σ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
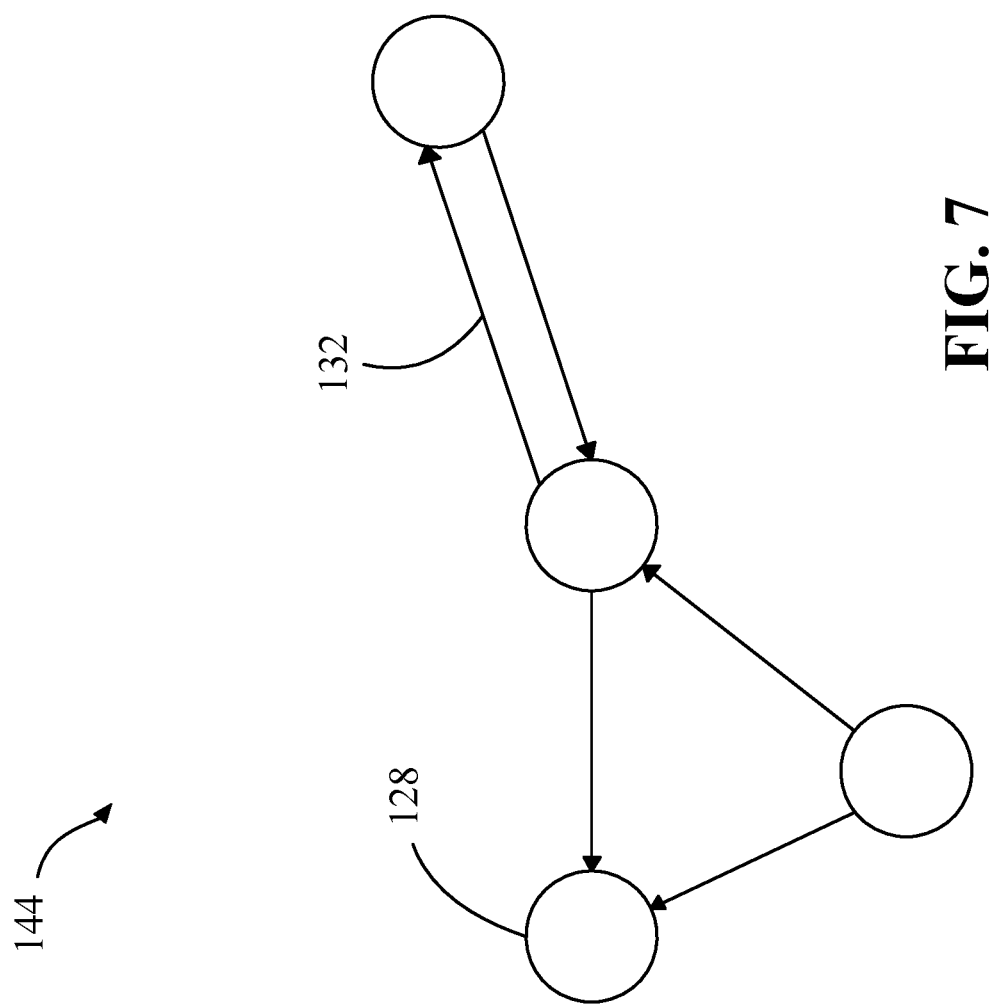
FIG. 7 illustrates an exemplary directed graph.

Referring now to FIG. 7, an exemplary directed graph 144 is illustrated. Directed graph 144 includes an ordered series of a plurality of execution elements 128 connected using at least an operation datum 132. Directed graph 144 may include nodes or also called vertices. Each node can have zero or more directed edges emanating from it. As a non-limiting example, nodes may include execution element 128. As a non-limiting example, an edge from node A to node B indicates that there is a relationship from A to B. As a non-limiting example, directed edges may include operation datum 132 or any data extrapolation 136 disclosed herein. In a non-limiting example, each of plurality of execution elements 128 may be a node of directed graph 144 and operation datum 132 may be an edge of the nodes. As a non-limiting example, processor 104 may generate ordered series of execution elements 128 as a function of weighted value of execution elements 128. For example, and without limitation, processor 104 may order execution elements 128 from the highest weighted value and lowest weighted value or vice versa. As another non-limiting example, processor 104 may generate ordered series of execution elements 128 as a function of confidence level. For example, and without limitation, processor 104 may order execution elements 128 from the highest confidence level and lowest confidence level. In some embodiments, directed graph 144 may be stored in graph database 120. In some embodiments, directed graph 144 may be retrieved from graph database 120. In some embodiments, user may manually generate directed graph 144 or processor 104 may generate directed graph 144 using machine-learning module. In some embodiments, processor 104 may be configured to generate directed graph 144 using convolutional neural network, stochastic analysis, probabilistic analysis, or the like described in the entirety of this disclosure. In some embodiments, processor 104 may be configured to determine a graph generation algorithm or machine-learning model to generate directed graph 144. As a non-limiting example, graph generation algorithm may include random graph models, topology-based algorithms, or the like.

Figure 8:
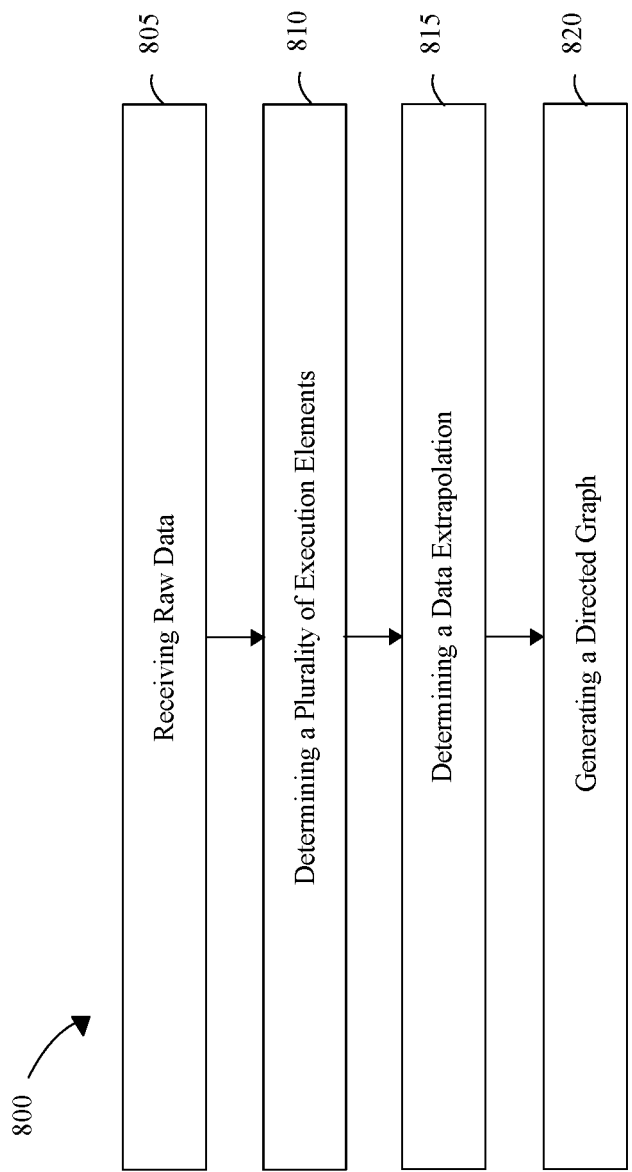
FIG. 8 illustrates a flow diagram of an exemplary method for generating a directed graph using raw data.

Referring now to FIG. 8, a flow diagram of an exemplary method 800 of generating digital graph using raw data. Method 800 includes a step 805 of receiving, using at least a processor, raw data from one or more data sources. These may be implemented as disclosed with respect to FIGS. 1-7.

With continued reference to FIG. 8, method 800 includes a step 810 of determining, using at least a processor, a plurality of execution elements from raw data. In some embodiments, method 800 may further include analyzing, using the at least a processor, the raw data using an automatic speech recognition. In some embodiments, method 800 may further include generating, using the at least a processor, element training data, wherein the element training data may include correlations between exemplary raw data and exemplary execution elements, training, using the at least a processor, an element machine-learning model using the element training data, wherein the element training data is iteratively updated through a feedback loop and determining, using the at least a processor, the plurality of execution elements using the trained element machine-learning model. These may be implemented as disclosed with respect to FIGS. 1-7.

With continued reference to FIG. 8, method 800 includes a step 815 of determining, using at least a processor, a data extrapolation of a plurality of execution elements, wherein determining the data extrapolation further includes determining at least an operation datum for the plurality of execution elements. In some embodiments, method 800 may further include determining, using the at least a processor, a weighted value of each of the plurality of execution elements and determining, using the at least a processor, the data extrapolation as a function of the weighted value of each of the plurality of execution elements. In some embodiments, method 800 may further include determining, using the at least a processor, an end user of the plurality of execution elements and determining, using the at least a processor, the at least an operation datum as a function of a plurality of characteristics of the end user. In some embodiments, method 800 may further include determining, using the at least a processor, at least an executor of the plurality of execution elements. In some embodiments, method 800 may further include determining, using the at least a processor, an execution token datum of the plurality of execution elements. In some embodiments, method 800 may further include generating, using the at least a processor, a confidence level of the data extrapolation. In some embodiments, method 800 may further include generating, using the at least a processor, extrapolation training data, wherein the extrapolation training data comprises correlations between exemplary execution elements and exemplary data extrapolations, training, using the at least a processor, an extrapolation machine-learning model using the extrapolation training data, wherein the extrapolation training data is iteratively updated through a feedback loop and determining, using the at least a processor, the data extrapolation using the trained extrapolation machine-learning model. These may be implemented as disclosed with respect to FIGS. 1-7.

With continued reference to FIG. 8, method 800 includes a step 810 of generating, using at least a processor, a directed graph as a function of a data extrapolation, wherein the directed graph includes an ordered series of a plurality of execution elements connected using at least an operation datum. In some embodiments, method 800 may further include converting, using the at least a processor, the directed graph into a plurality of linguistic terms using a large language model. These may be implemented as disclosed with respect to FIGS. 1-7.

It is to be noted that any one or more of the aspects and embodiments described herein may be conveniently implemented using one or more machines (e.g. one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g. a computing device) and that causes the machine to perform any one of the methodologies and/or embodiments described herein. Examples of a machine-readable storage medium include, but are not limited to, a magnetic disk, an optical disc (e.g. CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g. data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g. a computing device) and any related information (e.g. data structures and data) that causes the machine to perform any one of the methodologies and/or embodiments described herein.

Examples of a computing device include, but are not limited to, an electronic book reading device, a computer workstation, a terminal computer, a server computer, a handheld device (e.g. a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
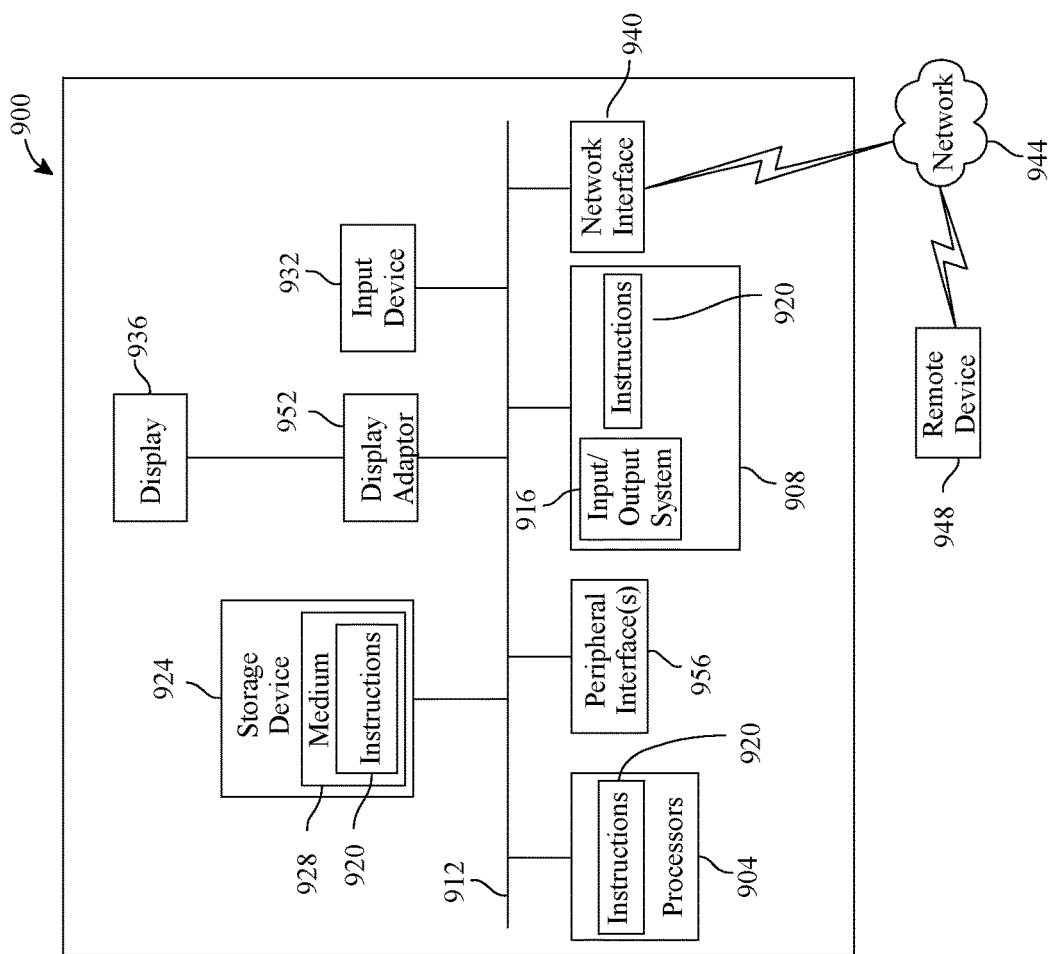
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g. machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g. stored on one or more machine-readable media) instructions (e.g. software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g. storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1384 (FIREWIRE), and any combinations thereof. In one example, storage device 924 (or one or more components thereof) may be removably interfaced with computer system 900 (e.g. via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g. a keyboard), a pointing device, a joystick, a gamepad, an audio input device (e.g. a microphone, a voice response system, etc.), a cursor control device (e.g. a mouse), a touchpad, an optical scanner, a video capture device (e.g. a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g. a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g. a mobile network interface card, a LAN card), a modem, and any combination thereof. Examples of a network include, but are not limited to, a wide area network (e.g. the Internet, an enterprise network), a local area network (e.g. a network associated with an office, a building, a campus or other relatively small geographic space), a telephone network, a data network associated with a telephone/voice provider (e.g. a mobile communications provider data and/or voice network), a direct connection between two computing devices, and any combinations thereof. A network, such as network 944, may employ a wired and/or a wireless mode of communication. In general, any network topology may be used. Information (e.g. data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention. Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus of generating directed graph using raw data, the apparatus comprising:
   at least a processor; and
   a memory communicatively connected to the at least a processor, wherein the memory contains instructions configuring the at least a processor to:
   receive raw data from one or more data sources;
   determine a plurality of execution elements from the raw data;
   determine a data extrapolation of the plurality of execution elements, wherein determining the data extrapolation further comprises:
      determining at least an operation datum for the plurality of execution elements; and
   generate a directed graph as a function of the data extrapolation, wherein the directed graph comprises an ordered series of the plurality of execution elements connected using the at least an operation datum.

2. The apparatus of claim 1, wherein the memory contains the instructions configuring the at least a processor to analyze the raw data using automatic speech recognition.

3. The apparatus of claim 1, wherein the memory contains the instructions configuring the at least a processor to:
   determine a weighted value of each of the plurality of execution elements; and
   determine the data extrapolation as a function of the weighted value of each of the plurality of execution elements.

4. The apparatus of claim 1, wherein the memory contains the instructions configuring the at least a processor to:
   generate element training data, wherein the element training data comprises correlations between exemplary raw data and exemplary execution elements;
   train an element machine-learning model using the element training data, wherein the element training data is iteratively updated through a feedback loop; and
   determine the plurality of execution elements using the trained element machine-learning model.

5. The apparatus of claim 1, wherein the memory contains the instructions configuring the at least a processor to:
   determine an end user of the plurality of execution elements; and
   determine the at least an operation datum as a function of a plurality of characteristics of the end user.

6. The apparatus of claim 1, wherein the memory contains the instructions configuring the at least a processor to determine at least an executor of the plurality of execution elements.

7. The apparatus of claim 1, wherein the memory contains the instructions configuring the at least a processor to determine an execution token datum of the plurality of execution elements.

8. The apparatus of claim 1, wherein the memory contains the instructions configuring the at least a processor to generate a confidence level of the data extrapolation.

9. The apparatus of claim 1, wherein the memory contains the instructions configuring the at least a processor to:
   generate extrapolation training data, wherein the extrapolation training data comprises correlations between exemplary execution elements and exemplary data extrapolations;
   train an extrapolation machine-learning model using the extrapolation training data, wherein the extrapolation training data is iteratively updated through a feedback loop; and
   determine the data extrapolation using the trained extrapolation machine-learning model.

10. The apparatus of claim 1, wherein the memory contains the instructions configuring the at least a processor to convert the directed graph into a plurality of linguistic terms using a large language model.

11. A method of generating a directed graph using raw data, the method comprising:
    receiving, using at least a processor, raw data from one or more data sources;
    determining, using the at least a processor, a plurality of execution elements from the raw data;
    determining, using the at least a processor, a data extrapolation of the plurality of execution elements, wherein determining the data extrapolation further comprises:
       determining at least an operation datum for the plurality of execution elements; and
    generating, using the at least a processor, a directed graph as a function of the data extrapolation, wherein the directed graph comprises an ordered series of the plurality of execution elements connected using the at least an operation datum.

12. The method of claim 11, further comprising:
    analyzing, using the at least a processor, the raw data using automatic speech recognition.

13. The method of claim 11, further comprising:
    determining, using the at least a processor, a weighted value of each of the plurality of execution elements; and
    determining, using the at least a processor, the data extrapolation as a function of the weighted value of each of the plurality of execution elements.

14. The method of claim 11, further comprising:
    generating, using the at least a processor, element training data, wherein the element training data comprises correlations between exemplary raw data and exemplary execution elements;
    training, using the at least a processor, an element machine-learning model using the element training data, wherein the element training data is iteratively updated through a feedback loop; and determining, using the at least a processor, the plurality of execution elements using the trained element machine-learning model.

15. The method of claim 11, further comprising:

determining, using the at least a processor, an end user of the plurality of execution elements; and determining, using the at least a processor, the at least an operation datum as a function of a plurality of characteristics of the end user.

16. The method of claim 11, further comprising:

determining, using the at least a processor, at least an executor of the plurality of execution elements.

17. The method of claim 11, further comprising:

determining, using the at least a processor, an execution token datum of the plurality of execution elements.

18. The method of claim 11, further comprising:

generating, using the at least a processor, a confidence level of the data extrapolation.

19. The method of claim 11, further comprising:

generating, using the at least a processor, extrapolation training data, wherein the extrapolation training data comprises correlations between exemplary execution elements and exemplary data extrapolations;

training, using the at least a processor, an extrapolation machine-learning model using the extrapolation training data, wherein the extrapolation training data is iteratively updated through a feedback loop; and determining, using the at least a processor, the data extrapolation using the trained extrapolation machine-learning model.

20. The method of claim 11, further comprising:

converting, using the at least a processor, the directed graph into a plurality of linguistic terms using a large language model.

* * * * *